United States Patent [19]

Nozaki

[11] Patent Number: 5,304,409
[45] Date of Patent: Apr. 19, 1994

[54] WEATHER STRIPPING

[75] Inventor: Masahiro Nozaki, Aichi, Japan

[73] Assignee: Toyoda Gosei Co., Ltd., Inazawa, Japan

[21] Appl. No.: 844,485

[22] Filed: Mar. 4, 1992

[30] Foreign Application Priority Data

Mar. 5, 1991 [JP] Japan .................. 3-064099

[51] Int. Cl.$^5$ .............. B32B 7/02; B60R 13/04; E06B 7/23
[52] U.S. Cl. .................. 428/122; 428/31; 428/212; 428/218; 428/343; 428/358; 428/492; 428/493; 292/DIG. 70; 52/399; 52/579
[58] Field of Search ............ 428/122, 358, 31, 343, 428/493, 212, 218, 492; 49/490, 496, 498; 52/399, 579; 296/93; 292/DIG. 70

[56] References Cited

U.S. PATENT DOCUMENTS

| 3,230,677 | 1/1966 | Brown | 296/93 |
| 4,246,303 | 1/1981 | Townsend | 428/122 |
| 4,614,347 | 9/1986 | Kruschwitz | 428/122 |
| 4,617,220 | 10/1986 | Ginster | 428/122 |
| 4,830,898 | 5/1989 | Smith | 49/490 |
| 4,880,674 | 11/1989 | Shimizu | 428/122 |
| 5,009,947 | 4/1991 | McManus | 428/122 |

FOREIGN PATENT DOCUMENTS 2036840 7/1980 United Kingdom ............... 428/122

Primary Examiner—Henry F. Epstein
Assistant Examiner—Nasser Ahmad
Attorney, Agent, or Firm—Cushman, Darby & Cushman

[57] ABSTRACT

A weather strip fixed in place by pressure against an adhesive tape attachment where the adhesive ability of the tape is increased, especially at points of high stress. The fixing portion of the weather strip includes hardened portions. The hardened portions are harder than the remaining body of the fixing portion material and are positioned so as to extend along the edge of the adhesive tape or where needed to properly assist in the transfer of sealing pressure from the fixing portion onto the adhesive tape. When the fixing portion is pressed in place, the pressure is more effectively transmitted to the desired area of the adhesive tape so that the fixing portion is more firmly adhered.

6 Claims, 3 Drawing Sheets

WEATHER STRIPPING

BACKGROUND OF THE INVENTION

1. Field of the Invention

This invention relates to weather stripping for use with a motor vehicle, particularly to weather stripping that is to be adhered to an automotive vehicle body by an adhesive and more specifically by adhesive tape.

2. Description of the Related Art

Generally weather stripping is fixed to an automotive vehicle body panel by adhesive tape, as described, for example, in U.S. Pat. No. 4,614,347 and U.S. Pat. No. 4,617,220.

FIG. 1 shows an example of adhesion type weather stripping. The weather strip, generally indicated at 30, is composed of a fixing portion 31 which in cross-section has a U-shape and a tubular sealing portion 32. The weather strip 30 is fixed to each side of a body panel flange 21 by an adhesion tape 4 provided on each of the opposing interior sides 33 of the fixing portion 31 by pressing both interior sides of the fixing portion 31 against tapes 4.

However, in practice the sides of flange 21, to which the adhesive tape 4 is fixed by pressing, is not always flat. There can be, for example, cratering caused by spot welding, sometimes something is fixed to the flange, the flange may include a twisted portion or some other surface or shape imperfection that prevents proper adhesion of the adhesive tape.

Consequently, there are some instances where the pressure used to secure the tape to the flange 21 is not transferred sufficiently, and the adhesive tape 4 does not adhere completely because of one or more of the above described problems. Should adhesion not be complete at the edge portion of cross direction of adhesive tape 4, there is the possibility of peeling or other problems associated with such incomplete sealing.

SUMMARY OF THE INVENTION

An object of the present invention is to offer a weather strip which has no possibility of peeling as a result of ineffective pressure at the time of pressing the weather strip onto a body panel and attachment through use of adhesive tape.

The main feature of the present invention is that a hardened portion or area is formed along and adjacent to the edge of the weather strip material. The hardened portion is harder than other portions of the weather strip material in the portion being fixed onto a body flange or to the automobile body. The purpose of the hardened portion is so that the pressing force used to mount and secure the weather strip in place on the vehicle may be effectively transferred to the adhesive tape and to the portion of the vehicle where the weather strip is being mounted.

DETAILED DESCRIPTION OF THE PREFERRED EMBODIMENTS

Figure 1:
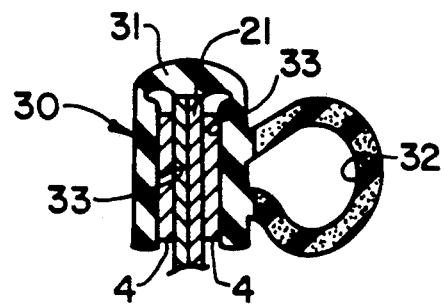
FIG. 1 is a cross-sectional view of a fixed conventional weather strip.
Figure 2:
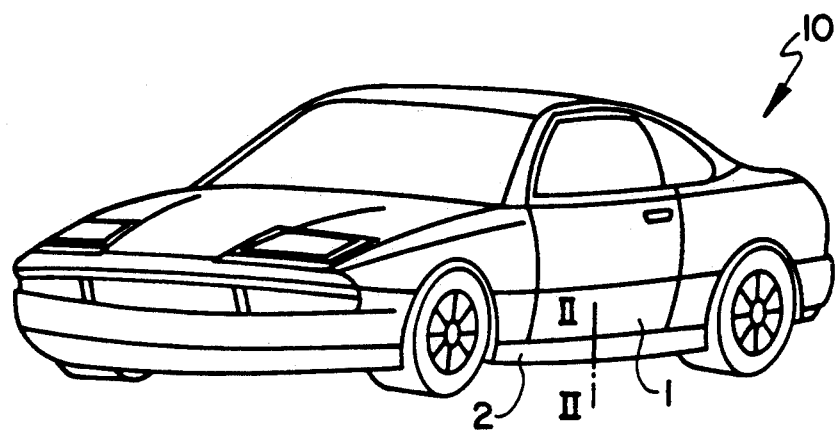
FIG. 2 is a diagrammatic perspective view of a motor vehicle to which the weather strip of the present invention is fixed.
Figure 3:
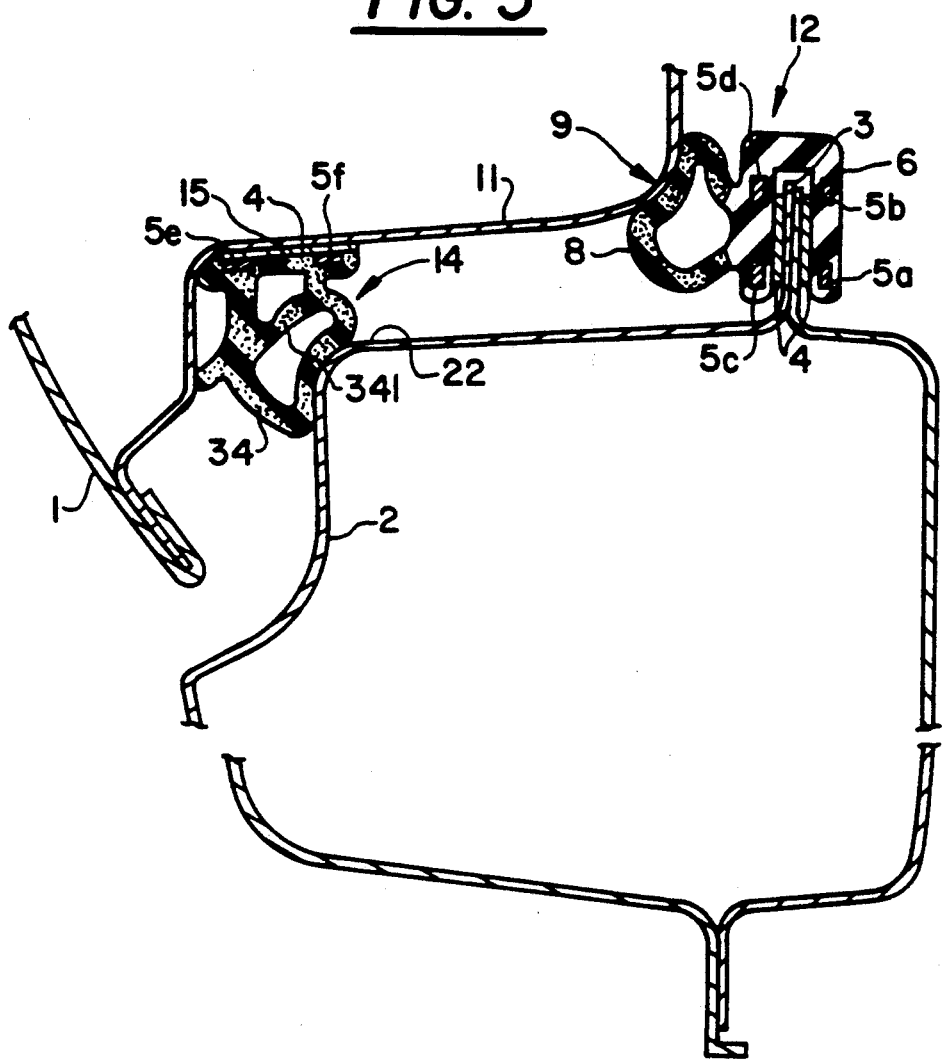
FIG. 3 is a cross-sectional view of fixed weather strips according to a first embodiment of the present invention taken along the line 2—2 in FIG. 2.

Turning first to FIG. 2, weather stripping is used at a variety of places on a motor vehicle as is indicated generally at 10 including, a door 1 and a rocker panel 2. As is more specifically shown in FIG. 3 the vehicle 10 includes a door, partially shown at 1, and a rocker panel structure, partially shown at 2, which includes an upstanding flange 3. FIG. 3 shows two types of weather strips, 12 and 14, fixed in respective positions around the periphery of the door panel, which seals a vehicle body opening, and specifically between the facing parts of the door and rocker panel structure. The first weather strip 12 is fixed to the rocker panel 2 and specifically on flange 3. Weather strip 12 faces an inner edge of the door panel 1. The second weather strip 14 faces inwardly toward the rocker panel 2, with which it interacts, and is fixed to the under edge of door panel 1.

FIG. 3 shows a cross-sectional view of both the first weather strips 12 and 14 along the line II—II in FIG. 2.

The first weather strip 12 is comprised of a fixing portion 6, having a generally U-shaped cross-section, that is preferably made of solid rubber, although other materials could be used that will provide the desired sealing capability over time. Portion 6 is fixed to the flange 3 of rocker panel 2. Weather strip 12 also includes a sealing portion 8 that is preferably made of sponge rubber and preferably has a tubular form that, in use will be pressed against an under corner 9 of an inner plate 11 of door panel 1. The sealing portion 8 could be made of other materials that are relatively soft, compatible with the material used for the fixing portion 6 and that would provide the desired sealing capability over time. The adhesive tape 4 is fixed to both the outwardly facing inner sides of flange 3, and inner sides of U-shaped portion 6 are adhered to flange 3 by pressing both walls of portion 6 to the outwardly facing sides of flange 3 and into contact with adhesive tape 4.

Each of the depending walls of the U-shaped area of fixing portion 6 include hard members or areas 5a, 5b, 5c and 5d, which are made of harder rubber than the rubber used in forming the majority of portion 6. The hardened members 5a–5d extend linearly along portion 6 and are embedded in the U-shaped area so that when fixing portion 6 is in its desired position the hardened members 5a–5d will overlie adhesive tape 4. When the weather strip 12 is in its desired position the adhesive tape 4 will be attached to the facing interior surfaces of the fixing portion 6 and through tape 4 to flange 3 with the flange lying within the U-shaped interior of fixing portion 6. Preferably, the hardened members 5a–5d are vertically spaced apart in both sides of the U-shaped area. The hardened members or areas could also be provided in discrete, separated or spaced apart lengths along the weather strip.

The first weather strip 12 is preferably made by extrusion molding techniques with the hardened portions 5a, 5b, 5c and 5d being integrally formed there within.

With reference still to FIG. 3, the second weather strip 14 includes a fixing portion 15 in the form of a flat belt. Strip 14 is attached to a bottom surface of inner plate 11 of door panel 1. Strip 14 also includes a sealing portion 34 which preferably has a tubular form and is divided or spaced from the fixing portion by a bridge 341. It should also be noted that strip 14 is secured or otherwise held into a corner of the door panel and that the tubular sealing portion 34 contacts corner portion 22 of rocker panel 2 at a location that is closer to the exterior of the vehicle than flange 3 of rocker panel 2.

The fixing portion 15 of weather strip 14 is attached to the inner plate 11 through use of adhesive tape 4 that had preferably been previously attached to inner plate 11. The fixing portion 15 and sealing portion 34 are each preferably made of sponge rubber although they could be made of other suitable, sealing materials.

Fixing portion 15 of strip 14 also includes hardened portions 5e and 5f made of solid rubber, thus forming a portion of the weather strip's base. The hardened portions 5e and 5f are positioned so that they would overlie the adhesive tape 4 where it would be attached to the vehicle in order to properly fix the weather strip in its desired location.

On the first weather strip 12, when both sides of the fixing portion 6 are pressed against flange 3, particularly at the edge portion of the adhesive tape 4 where the hardened portions 5a, 5b, 5c and 5d are embedded, the presence of such hardened portions assures that sealing pressure is transmitted effectively through the weather strip material to the adhesive tape 4 and that weather strip 12 is firmly fixed to flange 3.

In the same manner, the pressure applied to the fixing portion 15 of the second weather strip 14, acts effectively on both sides of the adhesive tape 4 and assures that fixing portion 15 is firmly secured to tape 4.

The hardened portion or portions need not always be provided along the fixing portions so as to extend along both edges of the adhesive tape. For example, use of such hardened portions might be provided only at the position where peeling tends to occur. On the weather strip 12, considering the edges of the adhesive tape 4, the edge of the opening side of the fixing portion 6 tends to peel, so that only the hardened portions 5a, 5c might be provided and the hardened portions 5b, 5d might be abbreviated.

Figure 4:
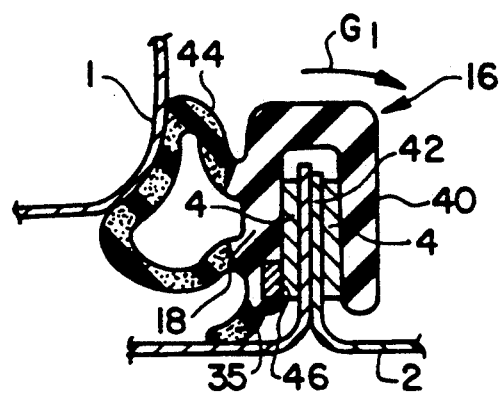
FIG. 4 is a cross-sectional view of a fixed weather strip according to a second embodiment of the present invention.

FIG. 4 shows a modified form of a weather strip 16 having a body sealing lip 35 which extends outwardly from the bottom edge 17 of the inner side wall 18 of the fixing portion 40 which is secured to flange 42. When door 1 is closed, a reaction force from the rocker panel 2 acts through the body sealing lip 35 and another force, due to the pressure between the tubular sealing portion 44 and the door 1, tends to incline the weatherstrip 16 toward the direction of arrow G1. These forces, when combined, tend to peel the inner side wall 18 from the adhesive tape 4. To help correct this, a hardened portion 46 is provided along the bottom edge 17 of side wall 18.

Figure 5:
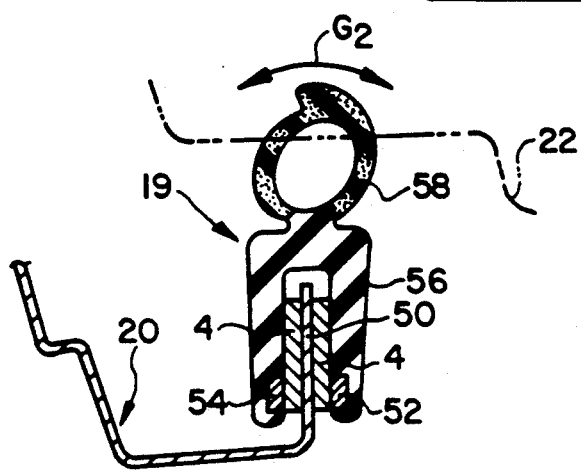
FIG. 5 is a cross-sectional view of a fixed weather strip according to a third embodiment of the present invention.

FIG. 5 shows a weather strip 19 fixed to a flange 50 extending around the peripheral edge of a trunk opening 20 of a vehicle, and for contacting the trunk lid 22. The weather strip 19 has hardened portions 52 and 54 at and along both sides of the opening, bottom edges of the U-shaped fixing portion 56. Good sealing ability is again needed on both sides of the fixing portion 56. Also, as luggage or other items are moved in and out of the trunk area, the upper edge of the sealing portion 58 of weather strip 19 extending about the opening is frequently struck tending to incline the weather strip 19 to both right and left as shown by arrow G2. Consequently, the fixing portion 56 tends to peel at both sides of the opening edges from adhesive tape 4. The presence of the hardened portions 52 and 54 resists this peeling possibility.

Figure 6:
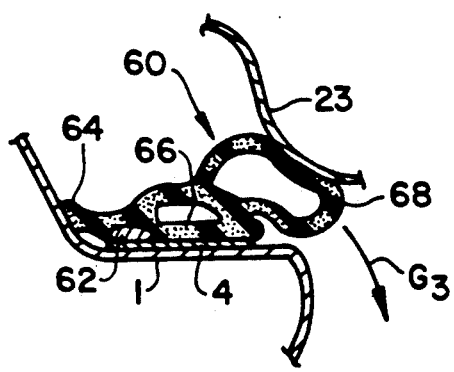
FIG. 6 is a cross-sectional view of a fixed weather strip according to a fourth embodiment of the present invention.

FIG. 6 shows a cross-sectional view of another form of weather strip 60 fixed to a back vertical edge of door 1 for touching a pillar 23. Weather strip 60 has a hardened portion 62 positioned at the side of the body sealing lip 64. The angled surface of pillar 23 tends to create a force acting in the direction of an arrow G3. The reaction force by the door 1 acts through the body sealing lip 64 extending outwardly from an edge of the fixing portion 66 and through the sealing portion 68. These forces tend to cause peeling adjacent the body sealing lip 64 so that use of hardened portion 62 adjacent lip 64 assures more uniform sealing force at this area and resists peeling.

Figure 7:
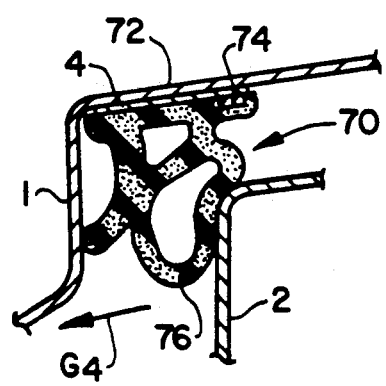
FIG. 7 is a cross-sectional view of a fixed weather strip according to a fifth embodiment of the present invention.

FIG. 7 shows a weather strip 70 having a cross-sectional shape somewhat similar to the second weather strip 14 shown in FIG. 2. However, the fixing portion 72 includes only the hardened portion 74 at and extending along the end portion of the outer side. An angled force is created by pressure from the rocker panel 2 against the tubular sealing portion 76 in the direction of arrow G4 and this force tends to peel the weather strip from adhesive tape 4 at the end portion of outer side. Use of hardened portion 74 along the edge at this outer side of portion 72 assures more uniform sealing along this outer edge and resists peeling.

Weather strip 12 is fixed along the rocker panel 2 and flexes back and forth relative to the vertical edge of flange 3 as the door of the vehicle opens and closes. The hard portions 5a, 5b, 5c and 5d merely form a relatively thin line, so that they do not obstruct the flexibility required of the fixing portion 6.

By using and positioning the hardened portion in this way, in each of the embodiments, the adhesive reliability of the weather strip rises. Further, sufficient adhesion is obtained when the fixing portion is pressed into contact with the adhesive tape. This pressure is similar to that which would be accomplished by drawing a roller or the like along the weather stripping.

While the invention has been described in connection with what is presently considered to be the most practical and preferred embodiment, it is to be understood that the invention is not to be limited to the disclosed embodiment, but on the contrary, is intended to cover various modifications or equivalent arrangements included within the spirit and scope of the appended claims.

What is claimed is:

1. An automotive weather stripping for sealing an interface between two structures, said weather stripping being comprised of:
   a tubular sealing portion made of sponge rubber; and
   a hardened rubber fixing portion operatively connected to one of the two structures,
   said hardened rubber fixing portion including:
   an adhesive portion having an adhesive to adhere the fixing portion to one of the two structures; and
   at least one embedded hardened area of a second harder rubber extending linearly along a length and width of said weather stripping and positioned on said fixing portion at a point of compression to the connection with said one of the two structures, said point receiving a peeling force when an external force is applied to said tubular portion, whereby external pressure applied to the at least one hardened area is transmitted to a discrete portion of the fixing portion and in turn to a discrete portion of the adhesive portion to adhere the fixing portion to the structure to which the fixing portion is tightly connected, preventing the peeling of said adhesive portion.

2. An automotive weather stripping for use in sealing an interface between two structures, said weather stripping being comprised of:
   a tubular sealing portion made of sponge rubber;
   a hardened rubber plate shaped fixing portion; and
   an adhesive tape on said fixing portion operatively connected to one of the two structures,
said hardened rubber fixing portion including:
   at least embedded hardened area positioned on said fixing portion of a second harder rubber extending linearly along one of the edges of said adhesive tape with a length and a width at a point of compression to the connection with said one of the two structures, said point receiving a peeling force when an external force is applied to said tubular sealing portion, whereby external pressure applied to the at least one hardened area is transmitted to said adhesive tape and in turn adheres the fixing portion to the structure to which the fixing portion is tightly connected, preventing the peeling of said adhesive tape.

3. The weather stripping as in claims 1 or 2 wherein the hardened area extends along the weather stripping in a discontinuous manner.

4. The weather stripping as in claims 1 or 2 wherein said fixing portion includes a plurality of spaced apart, hardened areas.

5. The weather stripping as in claim 1 wherein said fixing portion includes a plurality of independent hardened areas positioned along discrete portions of the structure and extending linearly along the weather stripping.

6. An automotive weather stripping for sealing an interface between two structures, said weather stripping being comprised of:
   a tubular sealing portion made of sponge rubber;
   a hardened rubber fixing portion; and
   an adhesive tape on said fixing portion operatively connected to one of the two structures,
said hardened rubber fixing portion including:
   at least one embedded hardened area positioned on said fixing portion of a second harder rubber extending linearly along one of the edges of said adhesive tape with a length and a width at a point of compression to the connection with said one of the two structures, said point receiving a peeling force when an external force is applied to said tubular sealing portion, so that an external pressure applied to the at least one hardened area is transmitted to said adhesive tape and in turn to adhere the fixing portion to the structure to which the fixing portion is tightly connected, preventing the peeling of the adhesive tape.

* * * * *